(12) United States Patent
Deadrick et al.

(10) Patent No.: US 6,601,906 B2
(45) Date of Patent: Aug. 5, 2003

(54) LOCKING DEVICE FOR THE ROOF OF A CONVERTIBLE CAR

(75) Inventors: Mark Deadrick, Beverly Hills, MI (US); Frank Marius Geyer, Southfield, MI (US); Khais Jumaah, Dearborn Hts., MI (US); Brad Smith, Brighton, MI (US)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/745,160

(22) Filed: Apr. 16, 2001

(65) Prior Publication Data

US 2002/0043808 A1 Apr. 18, 2002

(30) Foreign Application Priority Data

Dec. 31, 1999 (DE) ...................................... 299 23 089 U

(51) Int. Cl.[7] ................................................. B60J 7/185
(52) U.S. Cl. ................................ 296/121; 292/DIG. 5; 292/26
(58) Field of Search ............................. 296/121, 120; 292/DIG. 5, 26, 48

(56) References Cited

U.S. PATENT DOCUMENTS

| | | | | |
|---|---|---|---|---|
| 1,905,815 A | * | 4/1933 | Orlow | 292/48 X |
| 2,305,715 A | * | 12/1942 | Keller | 292/DIG. 5 X |
| 2,886,364 A | * | 5/1959 | Smith | 292/DIG. 5 X |
| 3,129,025 A | * | 4/1964 | Krueger | 292/DIG. 5 X |
| 5,328,229 A | * | 7/1994 | Brandt et al. | 296/121 |

* cited by examiner

Primary Examiner—Dennis H. Pedder
(74) Attorney, Agent, or Firm—Jordan and Hamburg LLP

(57) ABSTRACT

A closing device for a folding top of a convertible including a one-handed swiveling handle supported in a longitudinal median plane of the vehicle at the roof peak part. The swiveling handle has a rod which extends symmetrically to the longitudinal median plane of the vehicle and transfers a swiveling motion. The connecting rod is constructed as a torsion bar which can be shifted jointly with the swiveling handle about a drag bearing of the swiveling handle at the roof peak part. End parts of the torsion bar are mounted immovably at the roof peak part in the region of locking mechanisms engaging the windshield frame.

47 Claims, 9 Drawing Sheets

LOCKING DEVICE FOR THE ROOF OF A CONVERTIBLE CAR

BACKGROUND OF THE INVENTION

Figure 1:
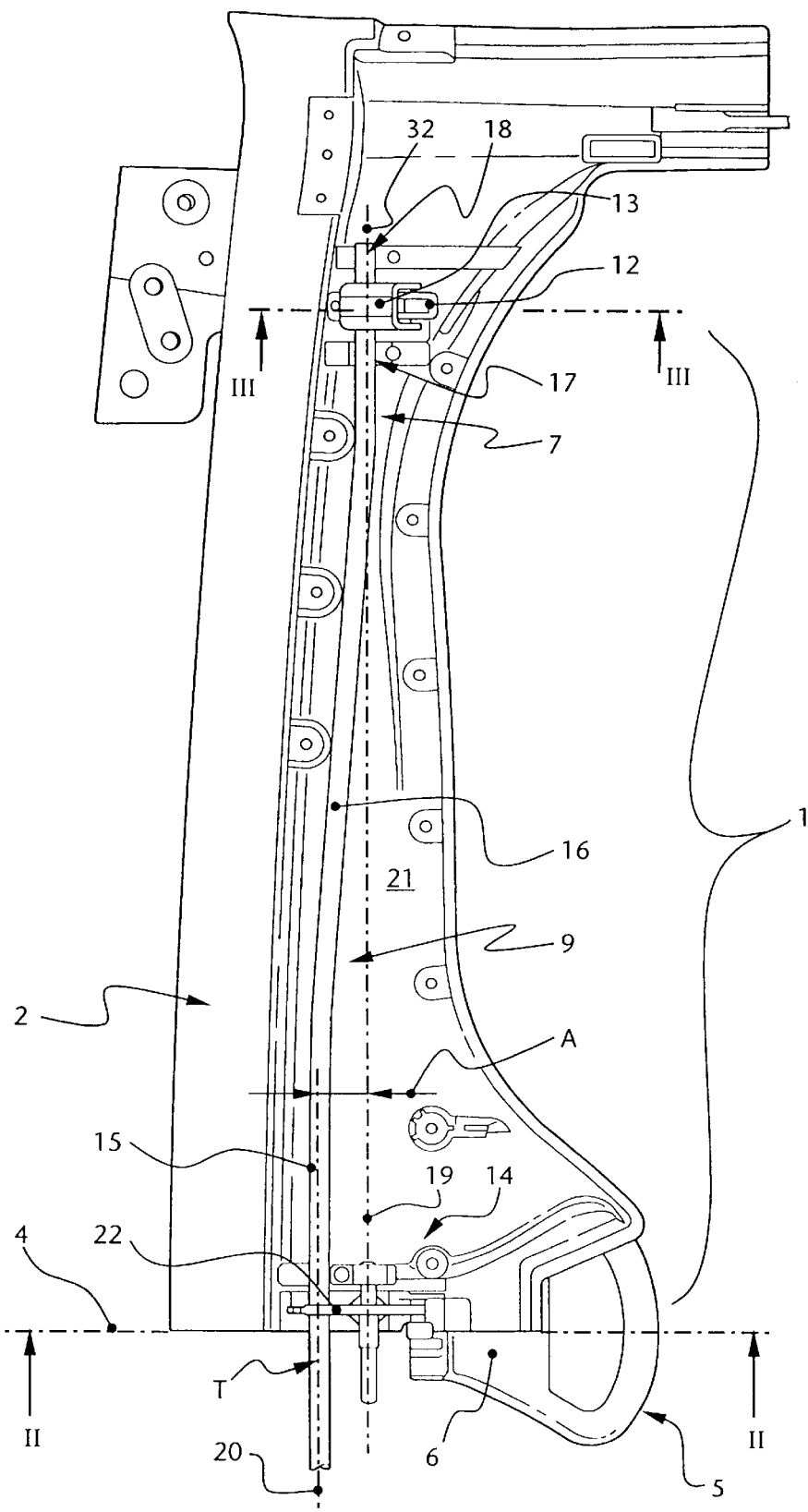

The invention relates to a closing device for a folding top for a convertible and a locking device for the roof of a convertible car.

The invention is concerned with the problem of creating a closing device for the folding top of a convertible of the type mechanisms are controlled by a small number of individual components and which can be shifted when not in use into a position in which the danger of damage and injury to the user is less and the operating comfort is improved.

SUMMARY OF THE INVENTION

In a locking device for a folding top of a convertible car in accordance with the invention, a torsion bar is provided for transferring the operating motion of a swiveling handle and has a profiled bend in the longitudinal direction so that the swiveling handle, interacting with two supporting/swiveling connections to a roof peak part provided at the ends of the torsion bar, and towards the respective locking mechanisms, forms a kinematic chain. This enables a movement, independent of the user, in the form of a forced control. After the device is actuated by means of the manually operated swiveling handle, the handle and the locking mechanisms of the closing device are shifted automatically, without additional hand movements, into a storage position. After that, components which can be moved out of the roof plane are secured in a position largely inaccessible to the user. In this manner, while the operating comfort is improved, injuries due to inadvertent contact with protruding components of the closing device are avoided.

The components of this forced control for the closing device are integrated with little technical effort in the roof peak part of the folding top so that, with few individual parts to be installed, a functionally reliable opening and closing kinematic is achieved. In view of the unimpeded accessibility of the simply constructed components, a rapid, low-cost, partial installation is possible during installation or repair work in the region of the closing device and, in the case of different tolerance dimensions, for example, in the region between the locking components and the abutment at the windshield frame, expensive adaptations are unnecessary because the parts can be adjusted easily.

With regard to further details and advantageous developments of the closing device in accordance with the invention, reference is made to the following description and the drawings, in which an example of the object of the invention is illustrated in greater detail.

IN THE DRAWINGS

Figure 6:
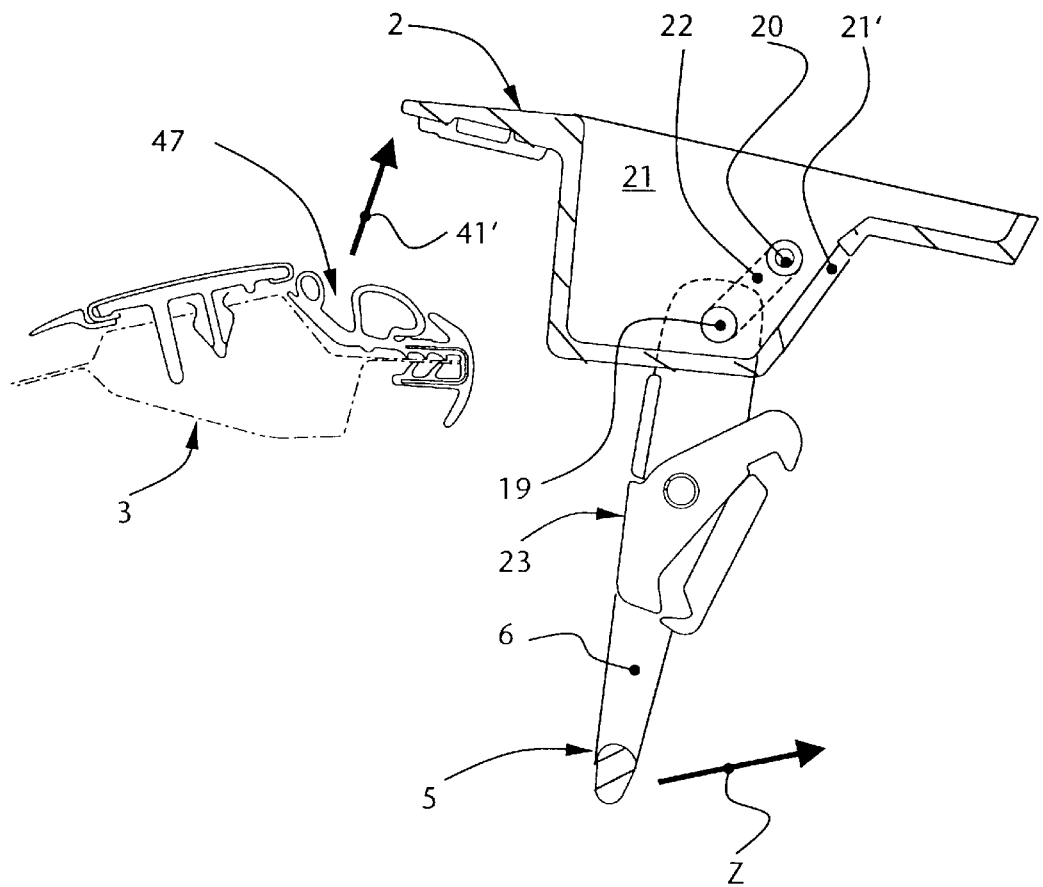
Figure 7:
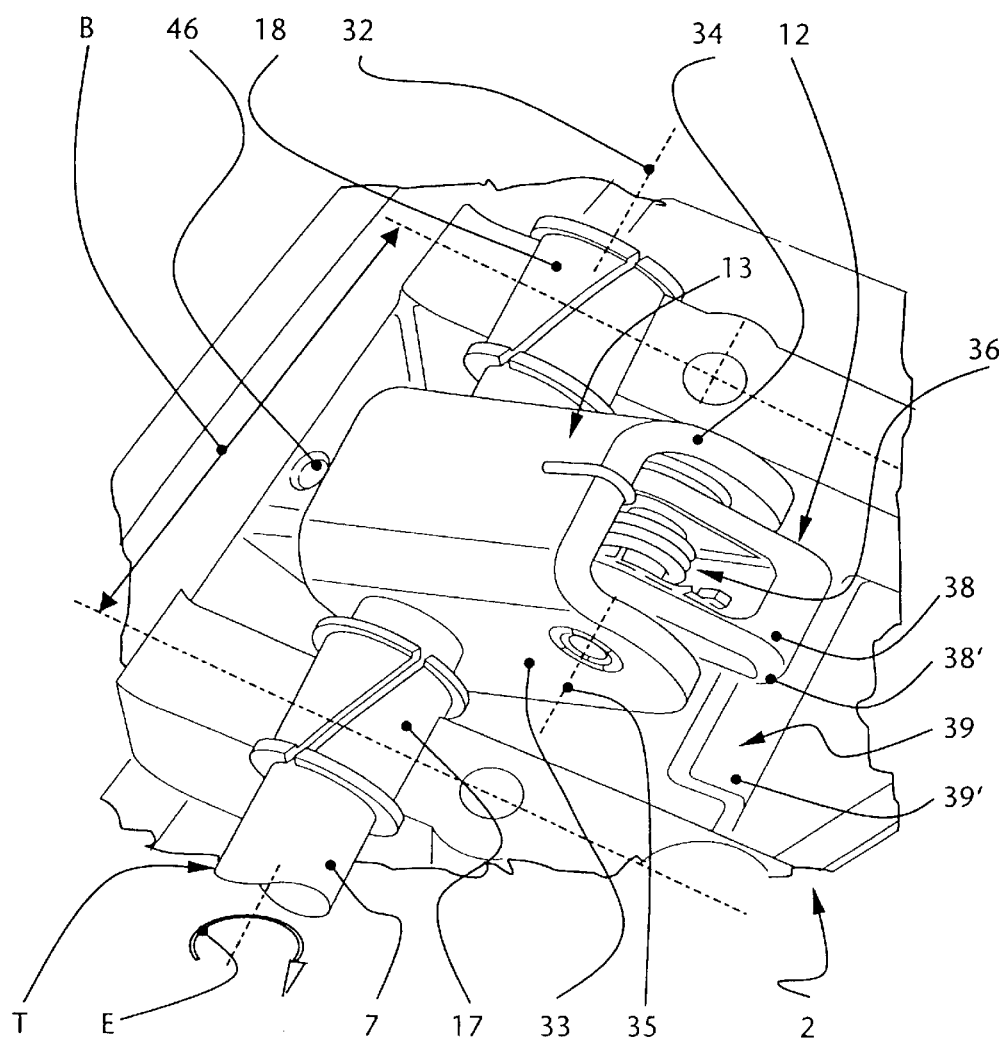

FIG. 1 shows a sectional representation of a partial region of a roof peak in which there is a closing device for a folding top of a convertible, the details of which are not shown, FIGS. 2–6 each show a sectional representation of the closing device in the region of a swiveling handle supported in the longitudinal median plane of the vehicle and the components of which in each case have different movement phases, FIG. 7 shows an enlarged sectional representation of the closing device in the region of one of the lateral locking mechanisms of FIG. 1, and FIGS. 8–13 show a sectional representation along a line III—III in FIG. 1 with different movement phrases in the region of the locking mechanism.

DESCRIPTION OF THE PREFERRED EMBODIMENTS

Figure 2:
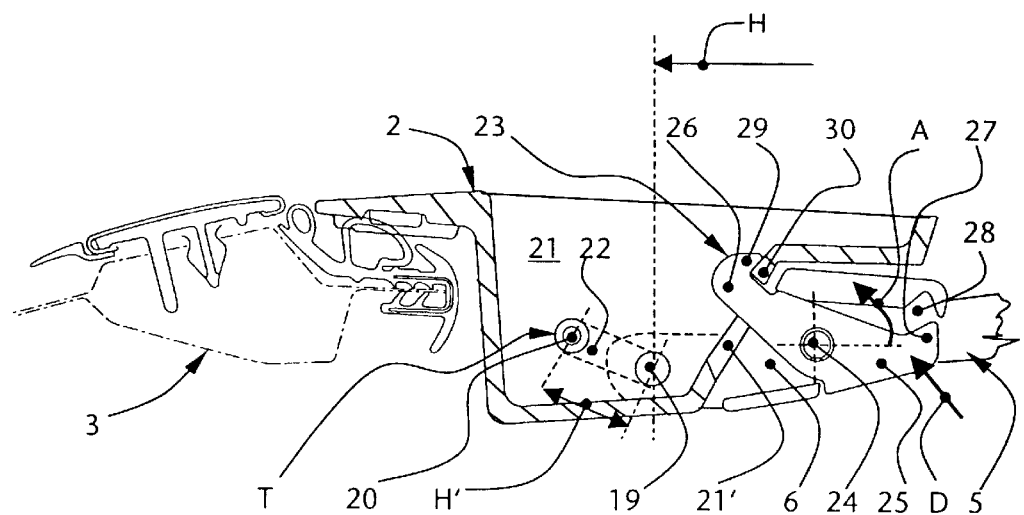

In FIG. 1, a closing device, which is labeled 1 as a whole, is shown in the left part of a roof peak 2, and by means of which the folding top of a convertible, the details of which are not shown, can be locked in the region of the windshield frame 3 (FIG. 2). The closing device I is provided with a single-handed swiveling handle 5 supported at the roof peak part 2 in the region of the longitudinal median plane 4 of the vehicle. In its actuating region 6, the single-handed swiveling handle 5 has a connecting rod 9 which extends symmetrically to the longitudinal median plane 4 of the vehicle and by means of which a swiveling movement (arrow C, FIG. 3), produced by the hand movement of a user, is transferred synchronously to the end parts 7 (and 8, not shown). The respective end part 7, 8, is provided with a locking mechanism 12 which, in the closed position of the folding top, engages an abutment 11 (FIG. 8) at the windshield frame 3 and is, in turn, guided pivotably by a holding body 13 (FIG. 7).

In the closing device 1, the connecting rod is constructed as a torsion bar T which can be displaced jointly with the swiveling handle 5 about a drag bearing 14 of the swiveling handle 5 at the roof peak part 2 and the end part 7 (or 8) in each case is mounted immovably at the roof peak part 2 in the region of the locking mechanism 12. Starting out from its middle part 15, which is fixed non-rotationally at the swiveling handle 5, the torsion bar T, in the longitudinal direction to the locking mechanism 12, in each case has an arched profiled part 16 so that a distance A integrated into the torsion bar T is formed between the middle part 15 and the offset-extending end part 7. The end part 7 of the torsion bar T, in turn, is supported immovably over an external and an internal friction bearing 17, 18.

In light of this construction of the kinematic chain within the closing device I with the torsion bar which can be displaced by a manual actuation in the region of the swiveling handle 5 and pivotably takes hold of the respective locking mechanism 12 at the roof peak part,2, when the folding top is displaced into the open position (FIG. 6), elastic stresses which act as restoring forces are produced in the closed position 1. In this manner, after the manual actuation is ended, the central swiveling handle 5 as well as the respective locking mechanism 12 in the region of the holding body 13 can be returned automatically towards the roof peak part 2 into a storage position (arrow Z, FIG. 6 or arrow Z', FIG. 13), these two components having opposite swiveling directions.

Figure 4:
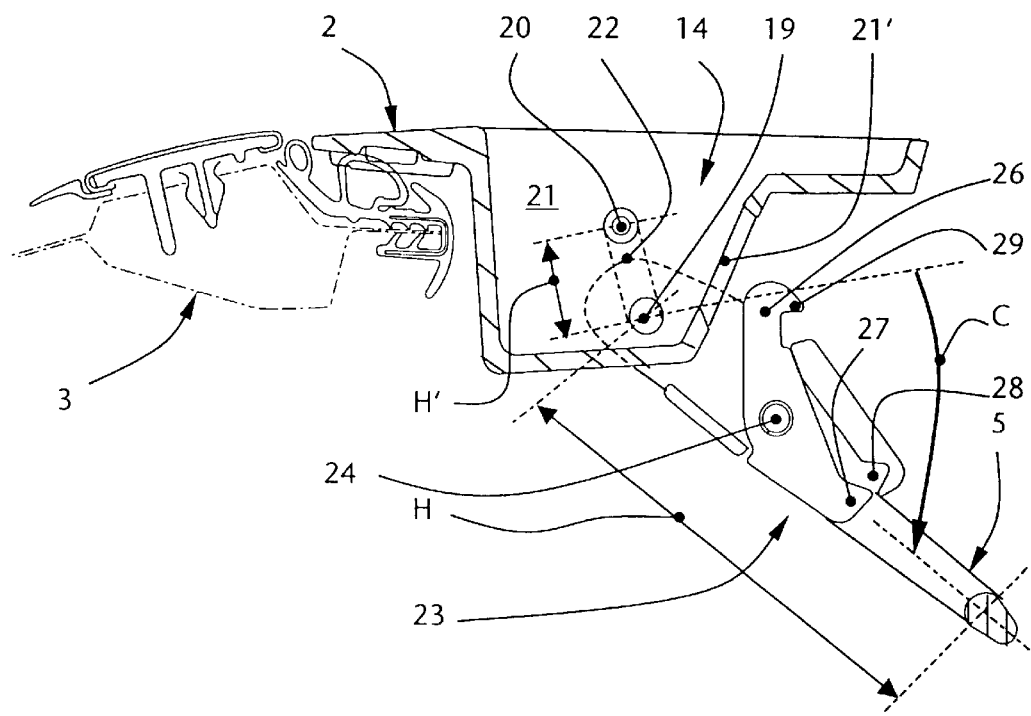
Figure 5:
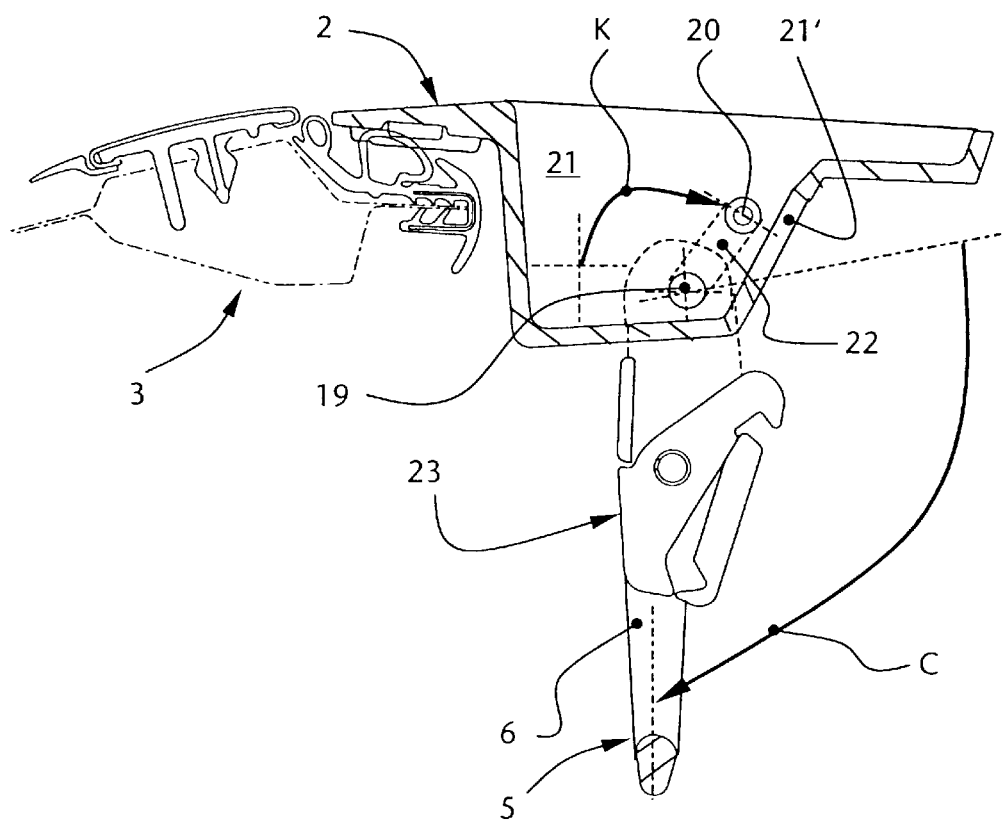

The plan view of FIG. 1 shows that the drag bearing 14 of the swiveling handle 5 has a swiveling axis 19 which in the closed position (FIG. 2) of the folding top lies in the direction of the longitudinal median plane 4 of the vehicle, in front of the actuating region 6 of the swiveling handle 5. In front of this swiveling axis 19, the torsion bar T is connected by a connecting axis 20 formed by the middle part 15 of the swiveling axis 19 with the swiveling handle 5. The swiveling position of FIG. 4 illustrates in a sectional side view that the swiveling handle 5 defines a first lever part H which extends to the swiveling axis 19 of the swiveling handle 5 and acts together with a second lever part H' in the form of a connecting strut 22 which takes hold of the middle part 15 of the torsion bar T in the region of the connecting axis 20.

Figure 13:
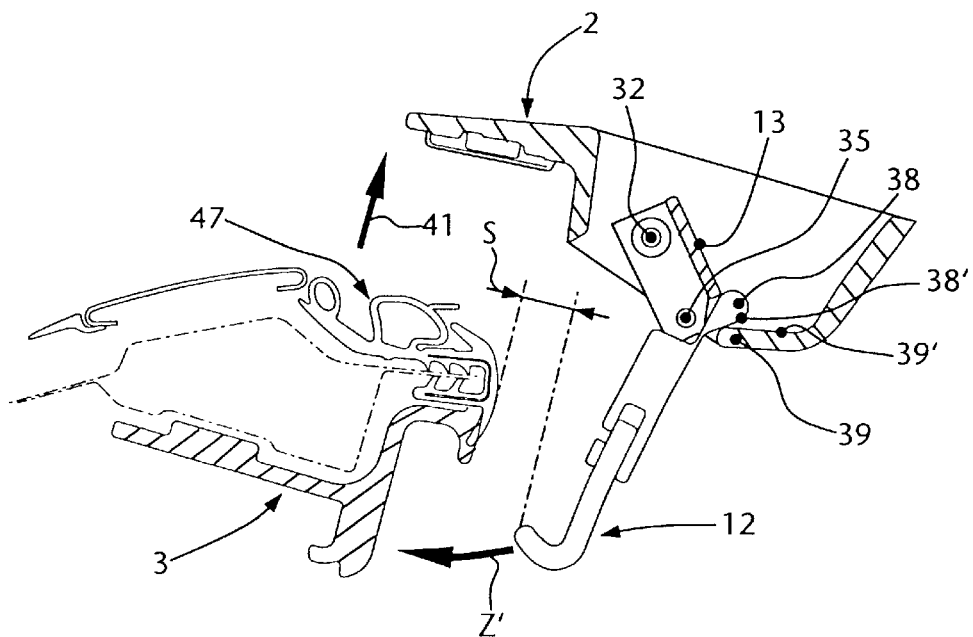

Starting out from the width, available for the connecting strut 22 (with the lever length H') in the roof part 2 or in a molded trough 21, the lever ratio H/H' can be selected so that by an optimum translation with the slight manual force of an operator, the torsional resistance of the torsion bar T and the frictional resistance in the region of the friction bearing 17, 18, are overcome and a problem-free unlocking is possible. The displacement of the torsion bar T (sequence of motions of FIGS. 3–5) together with the locking mechanisms 12 can be carried out manually even by an operator with little practice so that the roof peak part 3 can be detached simply with a high degree of operational comfort from the windshield frame 3 (FIG. 6, FIG. 13).

The displacement of the torsion bar T in the region of its central connecting axis 20 takes place during the opening movement by means of the swiveling handle 5 on a movement path (FIG. 5) extending above the drag bearing 14 or the swiveling axis 19 extending as an arc of a circle K. During this swiveling motion, the torsion bar T is shifted freely within the molded trough 21 arranged in the roof peak part 2 during the opening as well as during the closing process.

Figure 3:
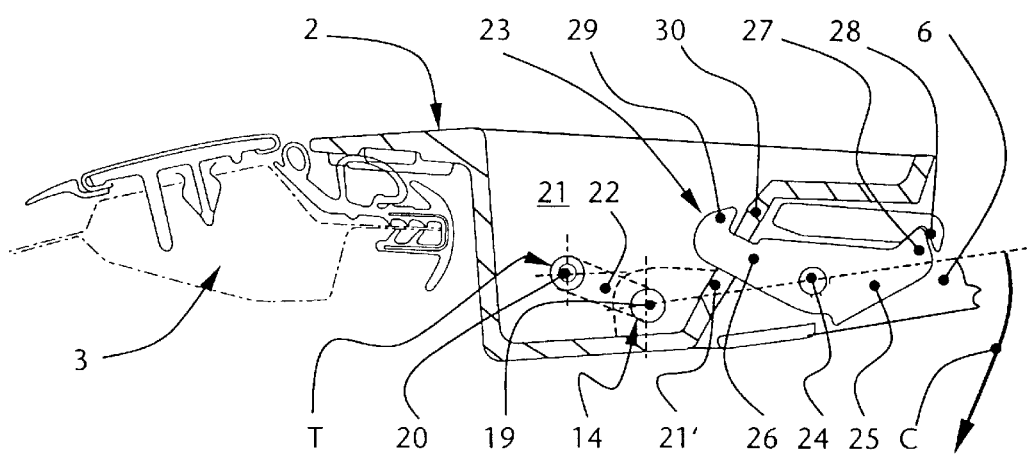

In FIG. 2, the swiveling handle 5 is shown in its closed position and has a lockable dead center position. For this locking, a locking hook 23 is arranged at the swiveling handle 5. The locking hook 23 is constructed essentially symmetrically to its swiveling axis 24 and has a pressure leg 25 and a hook part 26. By introducing a compressive force, illustrated by an arrow D, on the pressure leg 25, for example by exerting thumb pressure, the locking hook 23 is swiveled about the swiveling axis 24 (arrow A), a peak part 27 of the pressure leg 25 is shifted into a locking notch 28 at the swiveling handle 5 and, at the same time, a latch 29 of the hook part 26 is detached from an abutment 30 at the roof peak part 2 (FIG. 3). Thereafter, the swiveling handle 5 can be shifted in the opening direction (arrow C), the locking hook 23 being moved through an opening 21' out of the roof peak part 2. The locking hook 23 is supported at the swiveling handle 5 by a return spring, which is not shown, so that after the unlocking phase, the locking hook 23 can be swiveled automatically by the compressive force D out of the index notch 28 and remains in the position shown in FIG. 4. The locking takes place in the reverse sequence of motions.

In this opening position (FIG. 5) of the swiveling handle 5, the hand of the operator remains at the actuating region 6 of the swiveling handle and the roof peak part 2 can be detached from the windshield frame 3 as a whole by a lifting motion (arrow 41'). During a guided return (not shown), which then becomes possible by means of the torsion bar T into the position of FIG. 2, the above described movement of the component in the reverse sequence takes place and the locking hook 23 is swiveled through the opening 21' into the roof peak part 2.

In FIG. 7, the support of the torsion bar T in the region of its end parts 7 is shown with structural details. It can be seen that the end part 7 interacts with the two friction bearings 17, 18 arranged at a distance B and between which the respective holding body 13 is provided with the locking mechanism 12. This perspective representation of FIG. 7 illustrates that the holding body 13 in each case is constructed as a U-shaped profiled part which is supported in the region of a transverse axis 32, defined from the end part 7 of the torsion bar T and in turn defines the distance A to the connecting axis 20 of the middle part 15, by two parallel leg parts 33, 34 to the friction bearings 17, 18. A swiveling axis 35, supporting the locking mechanism 12, extends at a distance from the transverse axis 32 between the two leg parts 32 and 33.

In the region of the swiveling axis 35, the locking mechanism 12 is provided with a return spring 36 braced between the locking mechanism 12 and the holding body 13. The return spring 36 holds the locking mechanism 12 in the U-shaped holding body 13 (FIG. 7). During the opening and closing movements, the return spring 36 acts together with the torsion bar T and, during the introduction of a rotational movement E, synchronous with this opening movement C, the return spring 36, in the swiveling region of the holding body 13 (arrow 37), is acted upon with a pre-tension acting against the force of the spring. In this manner, after the opening process, the re-setting of the components can be supported so that the above-described movements, indicated by arrows Z and Z' (FIG. 6 or 13), can be repeated functionally reliably a large number of times. In FIGS. 10–13, these movement phases are illustrated in the region of the locking mechanism 12 in a representation, which is synchronous with the movement phases of the swiveling handle 5 of FIGS. 3–6, so that as a result of these movements, the production of the pre-tensions can be reconstructed in the torsion bar T as well as in the return spring 36.

Figure 8:
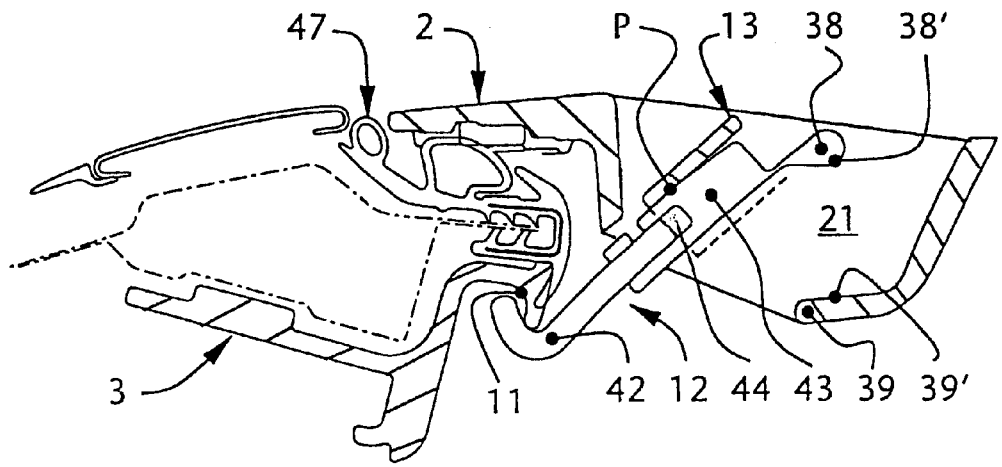
Figure 9:
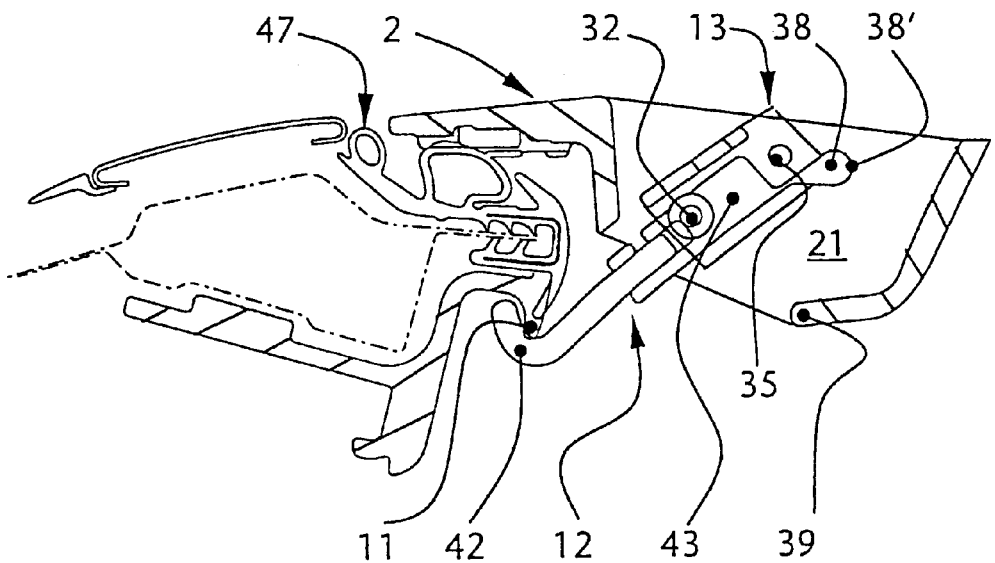
Figure 10:
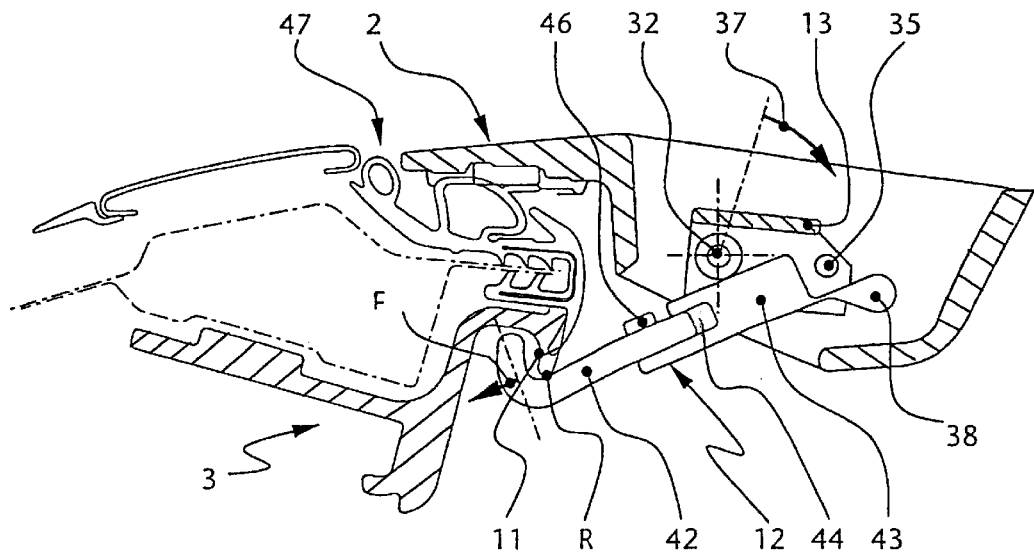

In the closed position shown in FIG. 8, the locking mechanism 12 is held at the windshield frame 3 and forms with the holding body 13 a dead center position, the two components lying in contact with one another in a region P and being fixed in this manner. When a swiveling motion C is introduced in the region of the swiveling handle 5, the holding body 13 is moved out of the dead center position (FIG. 9) and the locking mechanism 12 still remains at the windshield frame 3 in its closed position. As the opening process is continued in the region of the swiveling handle 5, the holding body 13 is swiveled in its swiveling direction 37 about the transverse axis 32, the locking mechanism 12 at the same time being released from the closed position at the abutment 11 (FIG. 10). At the same time, the locking mechanism 12 is guided from the abutment 11 into a region R, since the swiveling motion 37 in the region of the holding body 13 acts in this opening phase as a thrust motion in the region of the locking mechanism 12 (arrow F, FIG. 10).

Figure 11:
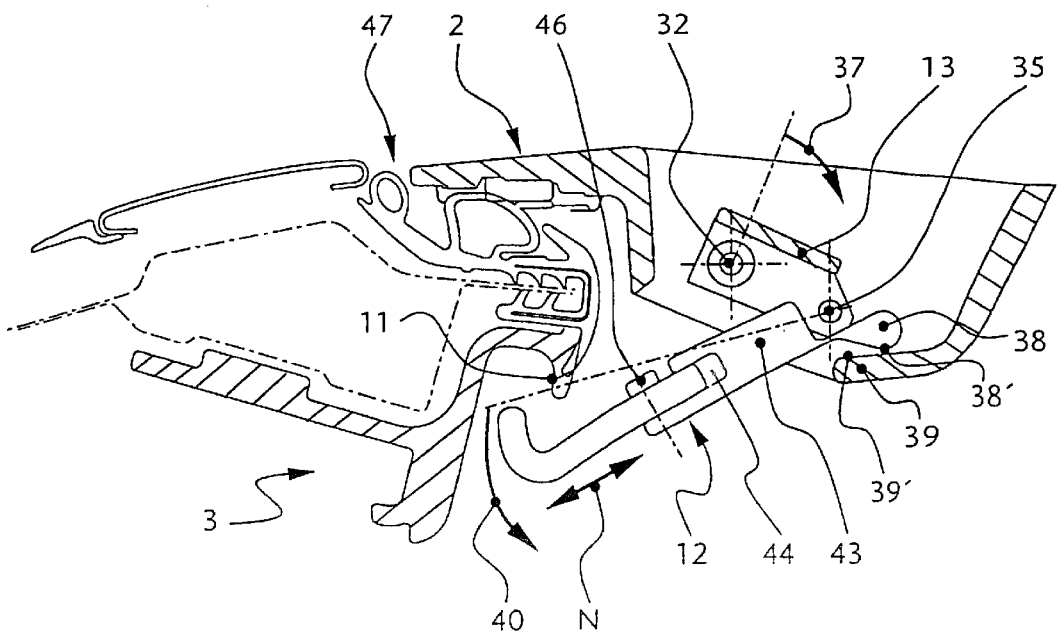
Figure 12:
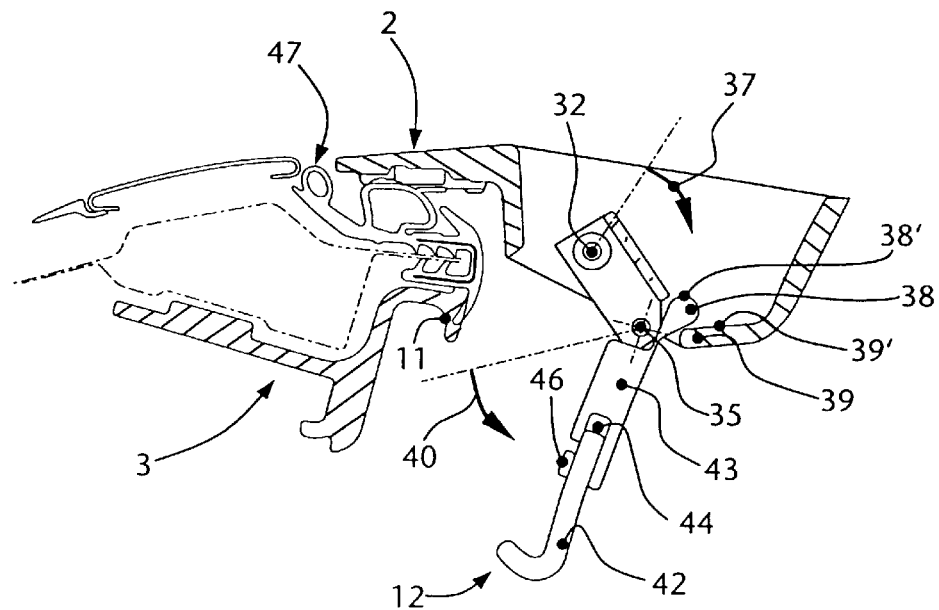

The continuation of the swiveling motion in the region of the swiveling handle 5 leads to the swiveling positions of the locking mechanism 12, which are shown in FIGS. 11–13. In the closing device in accordance with the invention, a rear supporting shoulder 38 is provided at the locking mechanism 12 and makes contact with an abutment 39 of the roof peak part 2. With this contact of the components, the above-described pretension of the return spring 36 can be initiated, a swiveling motion (arrow 40) now taking place against the force of the restoring spring and the locking mechanism 12 being shifted against the movement (arrow 37) of the holding body 13 (FIG. 11). At the same time, the locking mechanism 12 is moved about the swiveling axis 35 (FIG. 12) and out of the region of the abutment 11 at the windshield frame 3. At the same time, the movement of the locking mechanism 12 is guided by the supporting shoulder 38 in the form of a connecting link guide. A radii contour 38' of the supporting shoulder 38 rolls on a plane 39' of the abutment 39, a non-positive restricted guidance of the components being achieved and, at the same time, the swiveling axis 35 being displaced in the direction of the longitudinal median plane of the vehicle. The shifting of the swiveling axis 35 takes place until the locking mechanism 12 assumes an essentially vertical position (FIG. 13). In this swiveling position, the folding top can now be raised into an opening position of arrow 41 without colliding with the windshield frame 3. A gap S, adequate for movement, is now formed between the locking mechanisms 12 and the windshield frame 3 so that any unintended contact of the components is avoided.

After the folding top is lifted off and the swiveling handle 5 is released by the operator, the components can be swiveled back by the operator as described above. The spring action between the parts 7, 15 of the torsion bar T, which was shifted during the opening process and the pre-tension produced in the region of the restoring spring 36, at the same time being effective such that the swiveling handle 5 automatically swivels back in the direction of the roof peak part 2 (opposite to the sequence of motions of FIGS. 2–7) and the locking mechanism 12 also is swiveled into a position approximately parallel to the roof peak part 2 (FIG. 2). Accordingly, a storage position of the components of the closing device 1 is attained and the entire folding top can be shifted into an opening position in the rear of the vehicle, the details of which are not shown. At the same time, there are no protruding parts of the folding top in the region of the closing device 1 which may pose a danger to the operator.

For the sequence of motions described above, the locking mechanism 12 preferably is constructed in two parts with a locking hook 42 and a supporting body 43 which supports the locking hook 42. The supporting shoulder 38 can be placed against the counter-contour of the roof peak 2 and preferably is integrally molded in one piece with the supporting body 43. The locking hook 42 of the locking mechanism 12 is fixed at the supporting body 43 so that it can be shifted in an accommodating groove 44. In this manner, with little effort, the locking hook 42 or the locking mechanism 12 can be adapted optimally to the abutment 11 in the region of the windshield frame 3 by an adjustment by an adjusting screw 46. The locking hook 42 can be adjusted in the direction of arrow N (FIG. 11) such that, in the closed position, the locking mechanism 12 is clamped optimally and a reliably tight contact between the roof peak part 2 and the windshield frame 3 is achieved in the region of a sealing profile 47.

What is claimed is:

1. A closing device for a folding top of a convertible, comprising:
   a one-handed swiveling handle supported in a longitudinal median plane of the vehicle at a roof peak part;
   a connecting rod extending symmetrically to the longitudinal median plane of the vehicle and having end parts having locking mechanisms adapted to engage abutments at the windshield frame when the folding top is in a closed position, the locking mechanisms being guided pivotably by a holding body; and
   a drag bearing, the connecting rod being constructed as a torsion bar and arranged to be shifted jointly with the swiveling handle about the drag bearing at the roof peak part and the end parts of the torsion bar being rotatably mounted at said roof peak part in a region of the locking mechanisms,
   the torsion bar being structured and arranged to form a restricted guidance to the roof peak part when the folding top is in the open position in order to guide the respective locking mechanism in the region of the holding body and the central swiveling handle automatically into a storage position.

2. The closing device of claim 1, wherein a middle part of the torsion bar is fixed non-rotationally at t swiveling handle, the torsion bar having an arc-shaped profile part in the longitudinal direction to each of the locking mechanisms, the end part extending parallel to the middle part of the torsion part and adjoining the arc-shaped profile part and forming a stationary support towards the locking mechanism with at least one friction bearing.

3. The closing device of claim 2, wherein the drag bearing of the swiveling handle has a swiveling axis which, in the closed position of the folding top, lies in front oft as seen in the direction of the longitudinal median plane of the vehicle, the actuating region of the swiveling handle and, parallel in front of this swiveling axis, the torsion bar is connected with the swiveling handle by a connecting axis formed by the middle part.

4. The closing device of claim 2, wherein the swiveling handle defines a first lever part, which extends towards the swiveling axis of the swiveling handle and, on the other hand, interacts with a second lever part, which sakes hold of the middle part of d e torsion bar in the region of the connecting axis.

5. The closing device of claim 3, wherein the torsion bar, in the region of its middle connecting axis, is arranged to be swivelable during the opening motion of the swiveling handle above the drag bearing of the swiveling handle.

6. The closing device of claim 1, wherein the swiveling handle and the locking mechanism assume a lockable position in the closed position of the folding top.

7. A closing device for a folding top of a convertible, comprising:
   a one-handed swiveling handle supported in a longitudinal median plane of the vehicle at a roof peak part;
   a connecting rod extending symmetric y to the longitudinal median plane of the vehicle and having end parts having locking mechanisms adapted to engage abutments at the windshield frame when the folding top is in a closed position, the locking mechanisms being guided pivotably by a holding body;
   a drag bearing, the connecting rod being constructed as a torsion bar and arranged to be shifted jointly with the swiveling handle about the drag bearing at the roof peak part and the end parts of the torsion bar being rotatably mounted at said roof peak part in a region of the locking mechanisms; and
   a locking hook mounted at the swiveling paddle and arranged to be unlocked by finger pressure.

8. The closing device of claim 7, wherein the locking hook has a pressure leg shiftable into an index notch at the swiveling handle and a hook part arranged at the roof peak part to grip behind an abutment.

9. The closing device of claim 1, wherein the torsion bar interacts in the region of the respective end part with two friction bearings, which are arranged at a distance and between which the respective holding body with the locking mechanism is provided.

10. The closing device of claim 1, wherein the holding body for the locking mechanism in each case is constructed as a U-shaped profiled part which, in the region of a transverse axis, defined by the end part of the torsion bar, is supported by two parallel leg parts towards the friction bearings, a swiveling axis (35), supporting the locking mechanism, extending at a distance from this transverse axis between the two leg parts of the U-shaped profiled part.

11. The closing device of claim 10, wherein the locking mechanism is connected in the region of its swiveling axis with a restoring spring, fixed to the holding body.

12. The closing device of claim 1, wherein the locking mechanism is constructed in two parts with a locking hook and a supporting body, which supports the locking hook, and has, at the other end, a supporting shoulder arranged to engage an abutment of the roof peak part.

13. The closing device of claim 12, wherein the supporting shoulder is arranged at a rear of the supporting body of the roof peak part including an abutment arranged to support the supporting shoulder.

14. The closing device of claim 12, wherein the looking hook (42) of the locking mechanism is fixed at the supporting body so that it is movable in an accommodating groove.

15. A closing device for a folding top of a convertible, comprising:
   a handle;
   a connecting rod having a middle portion and two end portions;
   a drag bearing for coupling said handle to said middle portion of said connecting rod such that said connecting rod is movable upon movement of said handle and said end portions are on opposite sides of said handle;
   two locking mechanisms for locking the folding top to a windshield frame of the convertible when the folding top is in a closed position; and
   two holding bodies, each of said holding bodies being arranged on a respective one of said end portions of said connecting rod and guiding a respective one of said locking mechanisms,
   said connecting rod being arranged to guide said locking mechanisms and said handle automatically into a Storage position when the folding top is in an open position.

16. The closing device of claim 15, wherein said handle is a one-handed swivelling handle.

17. The closing device of claim 15, wherein said connecting rod is constructed as a torsion bar.

18. The closing device of claim 15, wherein said connecting rod has an arcuate portion between said middle portion and each of said end portions, said middle portion being substantially parallel to said end portions, further comprising friction bearings for supporting said end portions of said connecting rod.

19. The closing device of claim 15, wherein said drag bearing has a connecting strut connected to said handle along a common swivel axis in front of an actuating region of said handle and connected to said middle portion of said connecting rod along a common connecting axis.

20. The closing device of claim 15, wherein said handle defines a swivel axis and a first lever part extending toward said swivel axis, the closing device further comprising a second lever part attached to said middle portion of said connecting rod and interacting with said first,lever part.

21. The closing device of claim 15, wherein said connecting rod is arranged to swivel above said drag bearing during movement of said handle to open the folding top.

22. The closing device of claim 1, wherein said handle and said locking mechanisms are structured and arranged to be lockable in fixed positions when the folding top is in the closed position.

23. A closing device for a folding top of a convertible, comprising:
   a handle;
   a connecting rod having a middle portion and two end portions;
   a drag bearing for coupling said handle to said middle portion of said connecting rod such that said connecting rod is movable upon movement of said handle and said end portions are on opposite sides of said handle;
   two locking mechanisms for locking the folding top to a windshield frame of the convertible when the folding top is in at closed position;
   two holding bodies, each of said holding bodies being arranged on a respective one of said end portions of said connecting rod and guiding a respective one of said locking mechanisms; and
   a locking hook coupled to said handle for releasably locking said handle to the folding top.

24. The closing device of claim 23, wherein said handle includes an index notch, said locking hook including a pressure leg movable into said index notch of said handle to thereby lock said locking hook to said handle and a hook part for engaging with the folding top to thereby enable said handle to be maintained in connection with the folding top.

25. The closing device of claim 15, further comprising a pair of friction bearings for supporting each of said end portions of said connecting rod, said friction bearings of each pair being spaced from one another and a respective one of said holding bodies being arranged between said friction bearings of each pair.

26. The closing device of claim 15, wherein each of said holding bodies comprises a U-shaped part having two parallel leg parts between which the respective one of said locking mechanisms is pivotally mounted.

27. The closing device of claim 15, further comprising a respective restoring spring arranged between each of said locking mechanisms and the respective one of said holding bodies.

28. A closing device for a folding top of a convertible, comprising:
   a handle;
   a connecting rod having a middle portion and two end portions;
   a drag bearing for coupling said handle to said middle portion of said connecting rod such that said connecting rod is movable upon movement of said handle and said end portions are on opposite sides of said handle;
   two locking mechanisms for locking the folding top to a windshield frame of the convertible when the folding top is in a closed position; and
   two holding bodies, each of said holding bodies being arranged on a respective one of said end portions of said connecting rod and guiding a respective one of said locking mechanisms,
   each of said locking mechanisms comprising a locking hook and a supporting body having a first end at which said locking hook is supported and a second, opposite end forming a supporting shoulder, said supporting shoulder being adapted to engage the folding top.

29. The closing device of claim 28, wherein said supporting body includes a groove, said looking hook being attached to said supporting body such that it is slidable in said groove.

30. A convertible, comprising:
   a windshield frame;
   a folding top having a roof peak part and an open position in which said folding top is situated in a compartment of the vehicle and a closed position in which said folding top engages with said windshield frame; and
   a closing device arranged in said folding top for closing said folding top, said closing device comprising:
      a handle;
      a connecting rod having a middle portion and two end portions;
      a drag bearing for coupling said handle to said middle portion of said connecting rod such that said connecting rod is movable upon movement of said handle and said end portions are on opposite sides of said handle;
      two locking mechanisms for locking said folding top to said windshield frame when said folding top is in said closed position; and two holding bodies, each of said holding bodies being arranged on a respective one of said end portions of said connecting rod and guiding a respective one of said locking mechanisms.

said connecting rod being arranged to guide said locking mechanisms and said handle automatically into a storage position when said folding top is in said open position.

31. The convertible of claim 30, wherein said handle is a one-handed swivelling handle.

32. The convertible of claim 30, wherein said connecting rod is constructed as a torsion bar.

33. The convertible of claim 30, wherein said connecting rod has an arcuate portion between said middle portion and each of said end portions, said middle portion being substantially parallel to said end portions, further comprising friction bearings for supporting said end portions of said connecting rod.

34. The convertible of claim 30, wherein said handle is arranged in a longitudinal median plane of the convertible at said roof peak part.

35. The convertible of claim 30, wherein said connecting rod extends symmetrically to a longitudinal median plane of the vehicle.

36. The convertible of claim 30, wherein said drag bearing has a connecting strut connected to said handle along a common swivel axis in front of an actuating region of said handle and connected to said middle portion of said connecting rod along a common connecting axis.

37. The convertible of claim 30, wherein said handle defines a swivel axis and a first lever part extending toward said swivel axis, said closing device further comprising a second lever part attached to said middle portion of said connecting rod and interacting with said first lever part.

38. The convertible of claim 30, wherein said connecting rod is arranged to swivel above said drag bearing during movement of said handle to open said folding top.

39. The convertible of claim 30, wherein said handle and said locking mechanisms are structured and arranged to be lockable in fixed positions when said folding top is in the closed position.

40. A convertible comprising:
a windshield fame;
a folding top having a roof peak part and an open position in which said folding top is situated in a compartment of the vehicle and a closed position in which said folding top engages with said windshield frame; and
a closing device arranged in said folding top for closing said folding top, said closing device comprising:
a handle;
a connecting rod having a middle portion and two end portions;
a drag bearing for coupling said handle to said middle portion of said connecting rod such that said connecting rod is movable upon movement of said handle and said end portions are on opposite sides of said handle;
two locking mechanisms for locking said folding top to said windshield frame when said folding top is in said closed position;
two holding bodies, each of said holding bodies being arranged on a respective one of said end portions of said connecting rod and guiding a respective one of said locking mechanisms; and
a locking hook coupled to said handle for releasably locking said handle to said folding top.

41. The convertible of claim 40, wherein said handle includes an index notch, said locking hook including a pressure leg movable into said index notch of said handle to thereby lock said locking hook to said handle and a hook part for engaging with said folding top to thereby enable said handle to be maintained in connection with said folding top.

42. The convertible of claim 30, further comprising a pair of friction bearings for supporting each of said end portions of said connecting rod, said friction bearings of each pair being spaced from one another and a respective one of said holding bodies being arranged between said friction bearings of each pair.

43. The convertible of claim 30, wherein each of said holding bodies comprises a U-shaped part having two parallel leg parts between which the respective one of said locking mechanisms is pivotally mounted.

44. The convertible of claim 30, further comprising a respective restoring spring arranged between each of said locking mechanisms and the respective one of said holding bodies.

45. A convertible comprising:
a windshield frame;
a folding top having a roof peak part and an open position in which said folding top is situated in a compartment of the vehicle and a closed position in which said folding top engages with said windshield frame; and
a closing device arranged in said folding top for closing said folding top, said closing device comprising:
a handle;
a connecting rod having a middle portion and two end portions;
a drag bearing for coupling said handle to said middle portion of said connecting rod such that said connecting rod is movable upon movement of said handle and said end portions are on opposite sides of said handle;
two locking mechanisms for locking said folding top to said windshield frame when said folding top is in said closed position; and
two holding bodies, each of said holding bodies being arranged on a respective one of said end portions of said connecting rod and guiding a respective one of said locking mechanisms,
each of said locking mechanisms comprising a locking hook and a supporting body having a first end at which said locking hook is supported and a second, opposite end forming a supporting shoulder, said supporting shoulder being adapted to engage said folding top.

46. The convertible of claim 45, wherein said supporting body includes a groove, said looking hook being attached to said supporting body such that it is slidable in said groove.

47. The convertible of claim 30, wherein said roof peak part of folding top includes a trough, said connecting rod, said locking mechanisms, said drag bearing and said holding bodies being arranged in said trough.

* * * * *

UNITED STATES PATENT AND TRADEMARK OFFICE
CERTIFICATE OF CORRECTION

PATENT NO.    : 6,601,906 B2
DATED         : August 5, 2003
INVENTOR(S)   : Mark Deadrick et al.

It is certified that error appears in the above-identified patent and that said Letters Patent is hereby corrected as shown below:

<u>Title page,</u>
Item [22], Filed, change filing date from "April 16, 2001" to -- December 20, 2000 --.

Signed and Sealed this

Sixteenth Day of December, 2003

JAMES E. ROGAN
*Director of the United States Patent and Trademark Office*